United States Patent
Agapiou et al.

(10) Patent No.: US 12,244,178 B2
(45) Date of Patent: Mar. 4, 2025

(54) THERMAL CONNECTION SYSTEM FOR A STATOR CORE OF AN AXIAL FLUX ELECTRIC MOTOR

(71) Applicant: GM Global Technology Operations LLC, Detroit, MI (US)

(72) Inventors: John S. Agapiou, Rochester Hills, MI (US); Jian Yao, Shanghai (CN); Zhen Gao, Shanghai (CN); SeungHwan Keum, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 17/873,470

(22) Filed: Jul. 26, 2022

(65) Prior Publication Data
US 2024/0014699 A1    Jan. 11, 2024

(30) Foreign Application Priority Data
Jul. 5, 2022  (CN) .......................... 202210782749.0

(51) Int. Cl.
*H02K 1/20*    (2006.01)
*H02K 1/14*    (2006.01)
(Continued)

(52) U.S. Cl.
CPC .............. *H02K 1/20* (2013.01); *H02K 1/145* (2013.01); *H02K 1/16* (2013.01); *H02K 1/2798* (2022.01);
(Continued)

(58) Field of Classification Search
CPC .......... H02K 3/24; H02K 1/20; H02K 1/2798; H02K 21/24; H02K 9/225; H02K 5/203
(Continued)

(56) References Cited

U.S. PATENT DOCUMENTS

| | | | | |
|---|---|---|---|---|
| 4,295,067 A | * | 10/1981 | Binder | H02K 9/225 310/58 |
| 5,767,600 A | * | 6/1998 | Whiteley | H02K 3/47 310/58 |

(Continued)

FOREIGN PATENT DOCUMENTS

| | | | | |
|---|---|---|---|---|
| CN | 204517574 U | * | 7/2015 | ............. H02K 9/197 |
| CN | 105305724 A | * | 2/2016 | ............... H02K 5/18 |

(Continued)

OTHER PUBLICATIONS

WO 2019132261 A1 Translation (Year: 2019).*

(Continued)

*Primary Examiner* — Quyen P Leung
*Assistant Examiner* — Daniel K Schlak
(74) *Attorney, Agent, or Firm* — CANTOR COLBURN LLP

(57) ABSTRACT

An axial flux electric motor includes a housing including an inner surface and a stator fixedly mounted in the housing. The stator includes a plurality of stator segments each supporting a winding, an inner support member defining a central passage, and an outer annular member constraining the plurality of stator segments. The outer annular member includes an outer surface portion abutting the inner surface of the housing. A thermal connection system is disposed between the outer surface portion of the outer annular member and the inner surface. The thermal connection system transfers heat from the stator into the housing.

9 Claims, 5 Drawing Sheets

(51) Int. Cl.
*H02K 1/16* (2006.01)
*H02K 1/2798* (2022.01)
*H02K 3/24* (2006.01)
*H02K 5/20* (2006.01)
*H02K 7/00* (2006.01)
*H02K 16/02* (2006.01)
*H02K 21/24* (2006.01)
*H02K 9/22* (2006.01)

(52) U.S. Cl.
CPC ............ *H02K 5/203* (2021.01); *H02K 16/02* (2013.01); *H02K 3/24* (2013.01); *H02K 7/006* (2013.01); *H02K 9/227* (2021.01); *H02K 21/24* (2013.01)

(58) Field of Classification Search
USPC .................................................... 310/156.37
See application file for complete search history.

(56) References Cited

U.S. PATENT DOCUMENTS

| | | | |
|---|---|---|---|
| 6,731,028 B2 | 5/2004 | Derleth et al. | |
| 7,737,585 B2 | 6/2010 | Bahr et al. | |
| 9,203,271 B2* | 12/2015 | Inoue | H02K 5/203 |
| 10,461,593 B2* | 10/2019 | Fujihira | H02K 1/20 |
| 11,043,875 B2* | 6/2021 | Fatemi | H02K 5/203 |
| 2002/0074868 A1* | 6/2002 | Ishida | H02K 9/223 |
| | | | 310/54 |
| 2003/0048034 A1* | 3/2003 | Furuse | H02K 21/24 |
| | | | 310/112 |
| 2004/0075358 A1* | 4/2004 | Furuse | H02K 16/02 |
| | | | 310/156.32 |
| 2005/0035672 A1* | 2/2005 | Ward | B60L 3/0061 |
| | | | 310/156.37 |
| 2007/0262674 A1* | 11/2007 | Shibukawa | H02K 5/203 |
| | | | 310/156.32 |
| 2008/0303359 A1* | 12/2008 | Oestreich | H02K 5/203 |
| | | | 310/54 |
| 2012/0161554 A1* | 6/2012 | Ghelardi | H02K 11/33 |
| | | | 310/54 |
| 2014/0241865 A1* | 8/2014 | Arimatsu | F01D 25/12 |
| | | | 29/889 |
| 2016/0211718 A1* | 7/2016 | Lucchi | H02K 9/19 |
| 2020/0274410 A1* | 8/2020 | Yao | H02K 1/32 |
| 2021/0115925 A1* | 4/2021 | Iizuka | H02K 5/203 |
| 2021/0351658 A1* | 11/2021 | Jore | H02K 5/203 |
| 2022/0166268 A1* | 5/2022 | Duan | H02K 21/24 |
| 2022/0286001 A1* | 9/2022 | Leijnen | H02K 3/28 |
| 2022/0320980 A1* | 10/2022 | Liu | H02K 3/02 |
| 2023/0253844 A1* | 8/2023 | Haas | H02K 1/165 |
| | | | 310/65 |
| 2023/0387757 A1* | 11/2023 | Yao | H02K 9/223 |
| 2024/0136903 A1* | 4/2024 | Zou | H02K 21/24 |
| 2024/0213834 A1* | 6/2024 | Lamarre | H01F 7/02 |

FOREIGN PATENT DOCUMENTS

| | | | | |
|---|---|---|---|---|
| CN | 208986739 U | * | 6/2019 | ............ H02K 5/20 |
| CN | 112688522 A | * | 4/2021 | ............ H02K 16/02 |
| DE | 10048492 A1 | * | 4/2002 | ............ H02K 1/14 |
| DE | 10114321 A1 | | 10/2002 | |
| DE | 102004022557 A1 | | 12/2005 | |
| DE | 202004019482 U1 | | 4/2006 | |
| DE | 102004052070 A1 | * | 5/2006 | ............ H02K 1/20 |
| DE | 102022001408 A1 | | 6/2022 | |
| EP | 1045505 A2 | * | 10/2000 | ............ H02K 21/24 |
| EP | 1901418 A1 | | 3/2008 | |
| FR | 2817406 A1 | | 5/2002 | |
| WO | WO-2015075784 A1 | * | 5/2015 | ............ H02K 1/182 |
| WO | WO-2019132261 A1 | * | 7/2019 | ............ B60K 11/06 |
| WO | 2021074776 A1 | | 4/2021 | |
| WO | 2021115632 A1 | | 6/2021 | |
| WO | WO-2023215797 A2 | * | 11/2023 | ............ H02K 21/24 |

OTHER PUBLICATIONS

DE 102004052070 A1 Translation (Year: 2006).*
CN 204517574 U Translation (Year: 2015).*
CN 112688522 A Translation (Year: 2021).*
EP 1045505 A2 (Year: 2000).*
CN 208986739 U Translation (Year: 2019).*
CN 105305724 A Translation (Year: 2016).*
DE 10048492 A1 Translation (Year: 2002).*
WO 2015075784 A1 translation (Year: 2015).*

* cited by examiner

THERMAL CONNECTION SYSTEM FOR A STATOR CORE OF AN AXIAL FLUX ELECTRIC MOTOR

CROSS-REFERENCE TO RELATED APPLICATIONS

This application claims priority to China Patent Application No. CN202210782749.0, filed Jul. 5, 2022, the contents of which are incorporated by reference herein in their entirety.

INTRODUCTION

The subject disclosure relates to the art of electric machines and, more particularly, to a thermal connection system for a stator core of an axial flux electric motor.

Electric machines include a stator that is supported at an internal surface of a housing and a rotor that is positioned adjacent the stator. The stator includes stator windings that are energized to produce a magnetic field within the rotor. The magnetic field causes the rotor to spin and produce power. During operation, the stator and rotor produce heat. Various systems are employed to reduce heat produced by an electric machine including passing an airflow through the housing or incorporating coolant jackets into the housing.

In certain electric machines, such as axial flux machines, the stator is typically coupled to the housing by an insulator. The insulator, such as epoxy, may bond or secure the stator core to the housing. Materials such as epoxy have poor thermal conductivity. As such, heat transfer between the stator core and the housing may be reduced. Accordingly, it would be desirable to create a thermal flow path between the stator core into a surrounding housing in order to improve thermal dissipation without increasing flux leakage.

SUMMARY

In one non-limiting example, an axial flux electric motor includes a housing including an inner surface and a stator fixedly mounted in the housing. The stator includes a plurality of stator segments each supporting a winding, an inner support member defining a central passage, and an outer annular member constraining the plurality of stator segments. The outer annular member includes an outer surface portion abutting the inner surface of the housing. A thermal connection system is disposed between the outer surface portion of the outer annular member and the inner surface. The thermal connection system transfers heat from the stator into the housing.

In addition to one or more of the features described herein the thermal connection system includes an annular rib protruding from the inner surface and an annular recess formed in the outer surface portion of the outer annular member, the annular recess being receptive of the annular rib.

In addition to one or more of the features described herein the annular rib includes a first annular rib and a second annular rib that is axially spaced from the first annular rib.

In addition to one or more of the features described herein the annular recess includes a first annular recess receptive of the first annular rib and a second annular recess receptive of the second annular rib.

In addition to one or more of the features described herein each of the plurality of stator segments includes an opening receptive of a stator winding.

In addition to one or more of the features described herein each of the plurality of stator segments includes a microchannel extending about the stator winding, the microchannel being fluidically connected to the annular recess.

In addition to one or more of the features described herein the thermal connection system includes a cooling pipe disposed between the inner surface of the housing and the outer surface portion of the outer annular member.

In addition to one or more of the features described herein the inner surface of the housing includes an annular recess and the outer surface portion of the outer annular member includes annular recess portion, the cooling pipe being nested in the annular recess and the annular recess portion.

In addition to one or more of the features described herein a portion of the outer surface portion of the outer annular member directly contacts the inner surface of the housing and the cooling pipe directly contacts the outer surface portion of the outer annular member and the inner surface of the housing.

In addition to one or more of the features described herein the outer surface portion of the outer annular member is in direct contact with the inner surface of the housing.

In another non-limiting example, a vehicle includes a body, a plurality of wheels supporting the body, and an axial flux electric motor connected to at least one of the plurality of wheels through a transmission. The axial flux electric motor includes a housing including an inner surface and a stator fixedly mounted in the housing. The stator includes a plurality of stator segments each supporting a winding, an inner support member defining a central passage, and an outer annular member constraining the plurality of stator segments. The outer annular member includes an outer surface portion abutting the inner surface of the housing. A thermal connection system is disposed between the outer surface portion of the outer annular member and the inner surface. The thermal connection system transfers heat from the stator into the housing.

In addition to one or more of the features described herein the thermal connection system includes an annular rib protruding from the inner surface and an annular recess formed in the outer surface portion of the outer annular member, the annular recess being receptive of the annular rib.

In addition to one or more of the features described herein the annular rib includes a first annular rib and a second annular rib that is axially spaced from the first annular rib.

In addition to one or more of the features described herein the annular recess includes a first annular recess receptive of the first annular rib and a second annular recess receptive of the second annular rib.

In addition to one or more of the features described herein each of the plurality of stator segments includes an opening receptive of a stator winding.

In addition to one or more of the features described herein each of the plurality of stator segments includes a microchannel extending about the stator winding, the microchannel being fluidically connected to the annular recess.

In addition to one or more of the features described herein the thermal connection system includes a cooling pipe disposed between the inner surface of the housing and the outer surface portion of the outer annular member.

In addition to one or more of the features described herein the outer surface portion of the outer annular member is in direct contact with the inner surface of the housing.

In addition to one or more of the features described herein the inner surface of the housing includes an annular recess and the outer surface portion of the outer annular member includes annular recess portion, the cooling pipe being nested in the annular recess and the annular recess portion.

In addition to one or more of the features described herein a portion of the outer surface portion of the outer annular member directly contacts the inner surface of the housing and the cooling pipe directly contacts the outer surface portion of the outer annular member and the inner surface of the housing.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
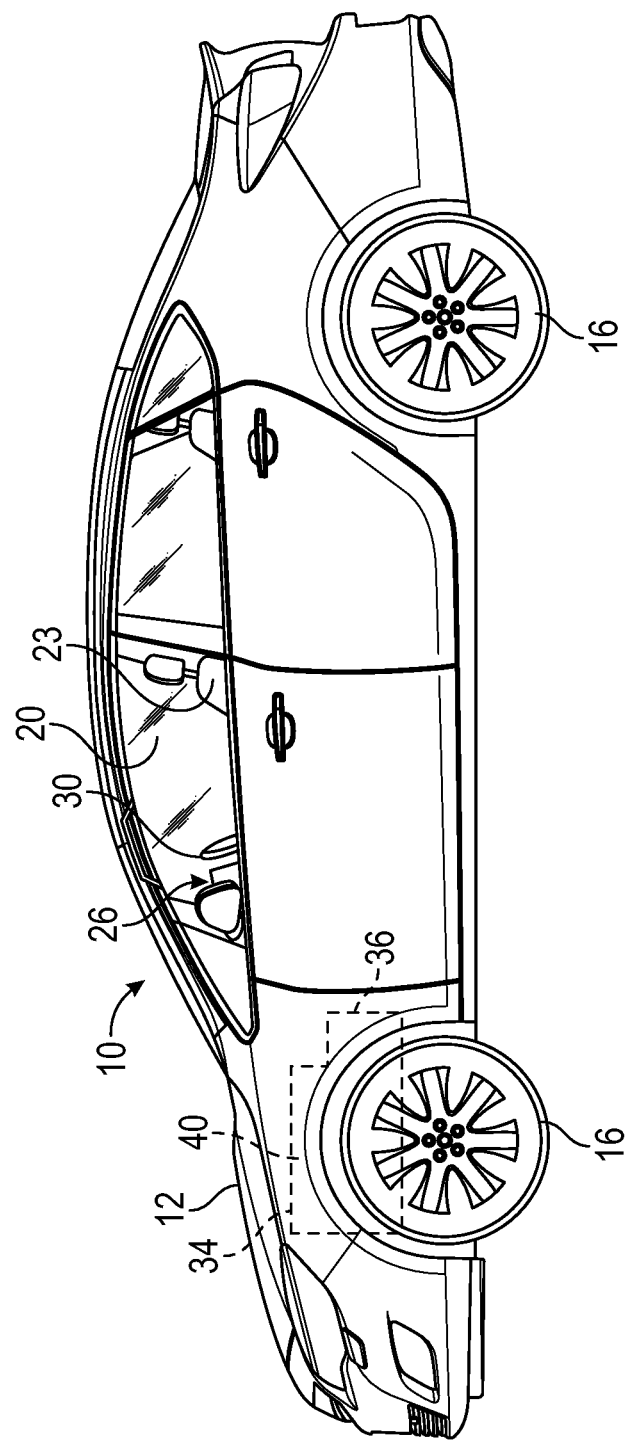
FIG. 1 illustrates a vehicle including an axial flux motor having a stator with a thermal connection system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least one of the plurality of wheels 16 is a steerable wheel. That is, changing a position of at least the one of the plurality of wheels 16 relative to body 12 will cause vehicle 10 to change direction. In the non-limiting example shown, both front wheels (not separately labeled) of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s). Vehicle 10 includes an electric motor 34 connected to a transmission 36 that provides power to one or more of the plurality of wheels 16.

Figure 2:
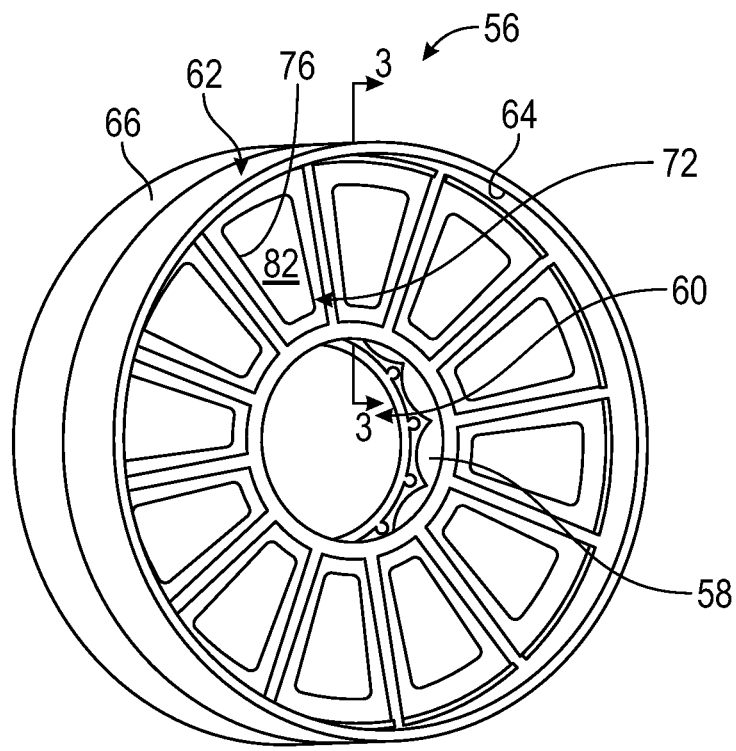
FIG. 2 is a perspective view of a portion of the axial flux electric motor of FIG. 1, in accordance with a non-limiting example.
Figure 3:
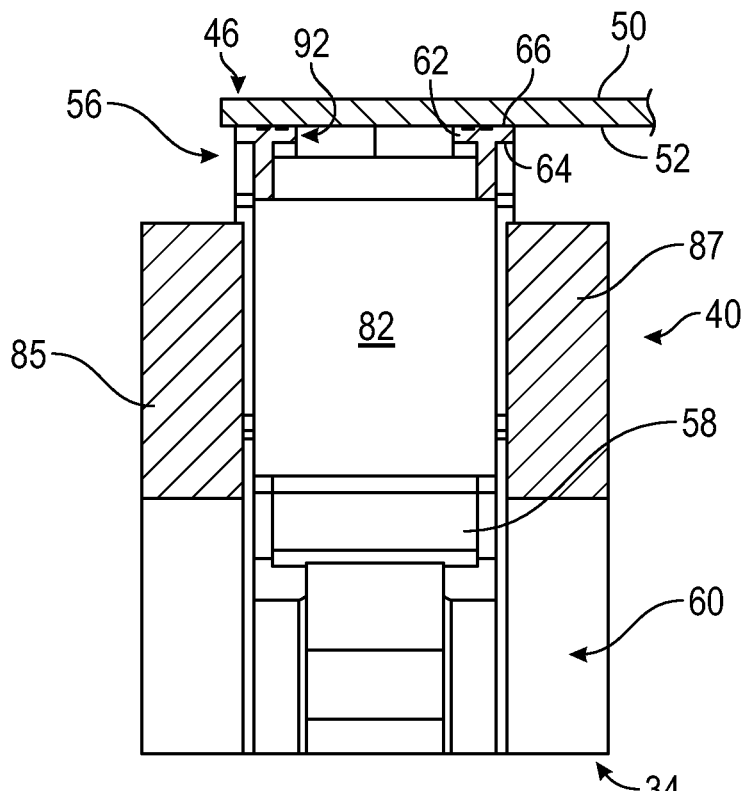
FIG. 3 is a partial cross-sectional side view of the axial flux electric motor of FIG. 2 taken along the line 3-3, in accordance with a non-limiting example.

In a non-limiting example, electric motor 34 takes the form of an axial flux electric motor 40 having a housing 46 as shown in FIGS. 2 and 3. Housing 46 includes an outer surface 50 and an inner surface 52. In a non-limiting example, a stator 56 is arranged within housing 46. Stator 56 includes an inner support member 58 that defines a passage 60, and an outer annular member 62. Outer annular member 62 includes an inner surface portion 64 and an outer surface portion 66. A plurality of stator segments, one of which is indicated at 72, is disposed between inner support member 58 and outer annular member 62.

Figure 7:
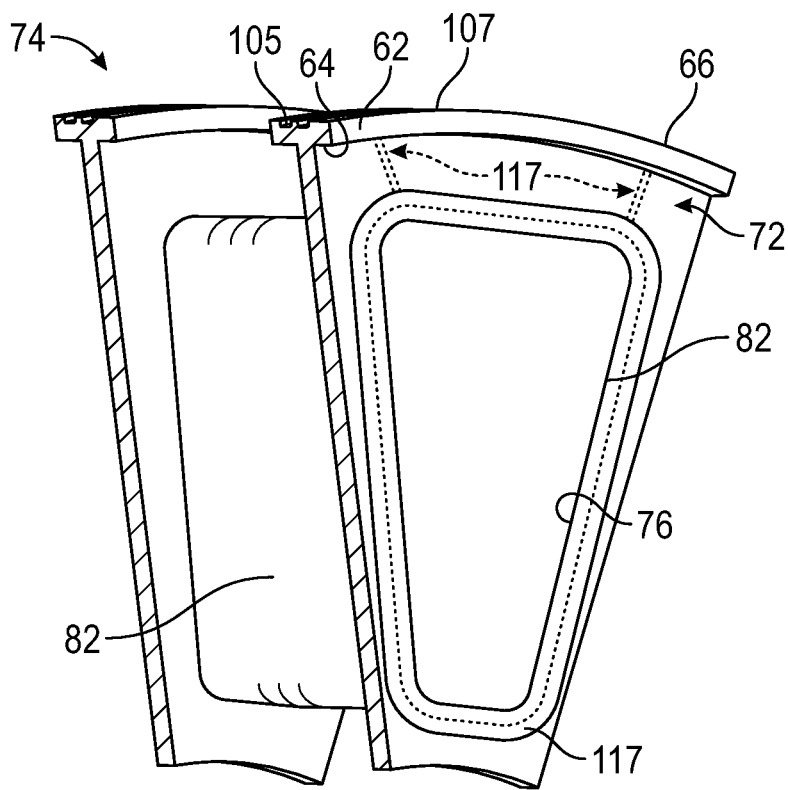
FIG. 7 is a partial perspective view of a pair of stator core segments connected by a stator winding, in accordance with a non-limiting example.

Plurality of stator segments 72 are arranged in stator segment pairs such as shown at 74 in FIG. 7. Each of the plurality of stator segments 72 includes an opening 76 that is receptive of a stator winding 82. That is, stator winding 82 is arranged in opening 76 and is supported by each stator segment pair 74. Axial flux electric motor 40 includes a first rotor 85 (FIG. 3) arranged axially outwardly of stator 56 in a first direction and a second rotor 87 (FIG. 3) arranged axially outwardly of stator 56 in a second direction that is opposite the first direction. First rotor 85 and second rotor 87 are supported by or mounted on a shaft (not shown) that extends through passage 60.

In a non-limiting example, stator 56 is joined to inner surface 52 of housing 46 through a thermal connection system 92. Thermal connection system 92 creates or establishes a direct surface-to-surface contact between outer surface portion 66 of outer annular member 62 and inner surface 52 of housing 46. Stator 56 may be press fit into housing 46. Thermal connection system 92 takes the form of surface features (not separately labeled) formed on outer surface portion 66 of outer annular member 62 and inner surface 52 that create an increased contact area between stator 56 and housing 46.

Figure 4:
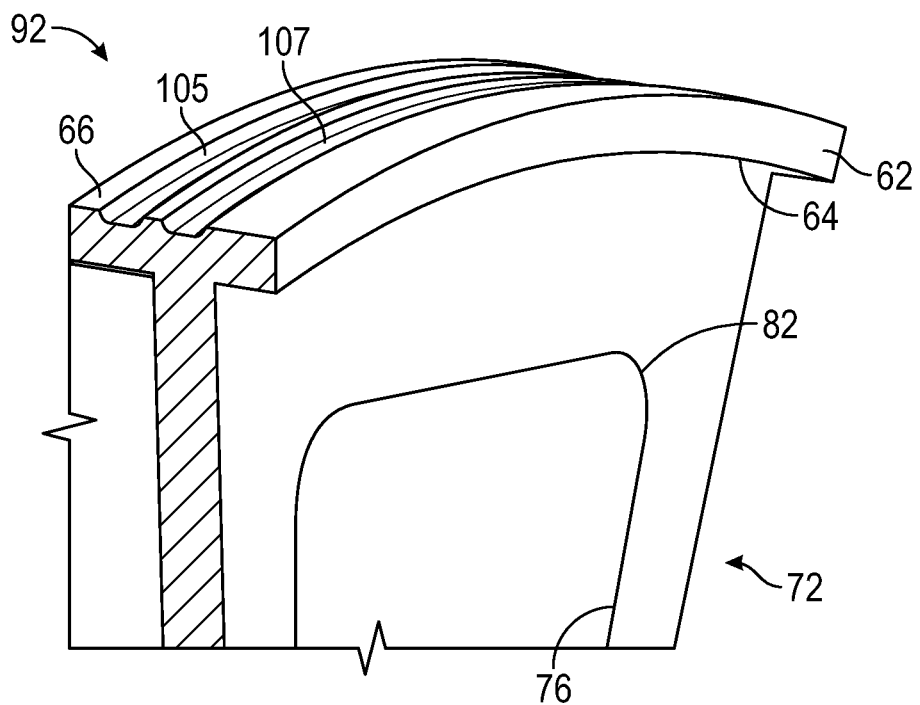
FIG. 4 is a partial perspective view of a stator core segment of the stator core of FIG. 3 having a first portion of a thermal connection system, in accordance with a non-limiting example.
Figure 5:
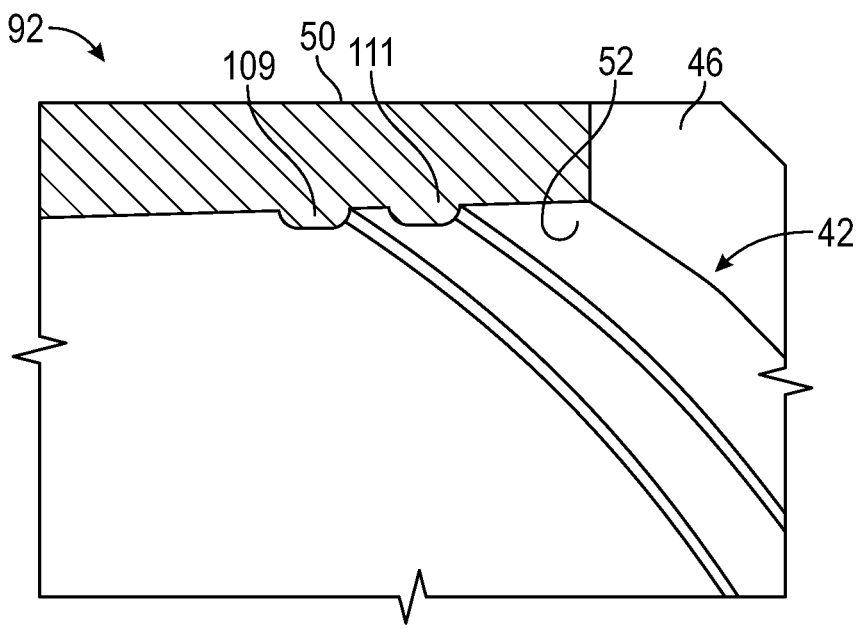
FIG. 5 is a partial perspective view of an inner surface of a housing of the electric motor of FIG. 3 having a second portion of the thermal connection system, in accordance with a non-limiting example.

In a non-limiting example, shown in FIG. 4, thermal connection system 92 may include a first annular recess 105 and a second annular recess 107 formed in outer surface portion 66 of outer annular member 62. Second annular recess 107 is axially spaced from first annular recess 105. Thermal connection system 92 also includes a first annular rib 109 and a second annular rib 111 that are formed on, and project radially outwardly of, inner surface 52 of housing 42 as shown in FIG. 5.

Figure 6:
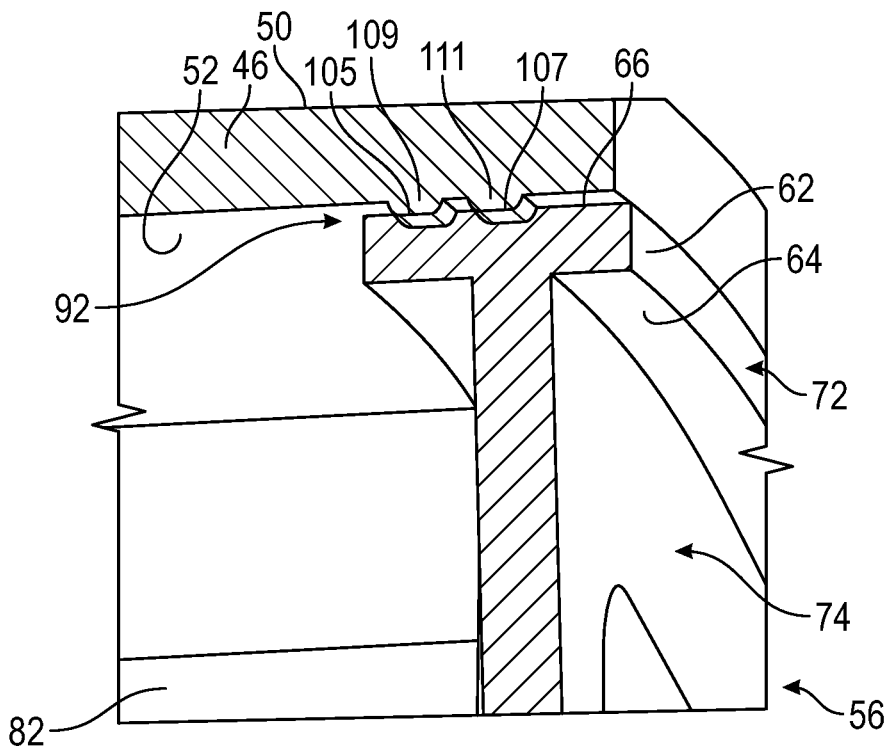
FIG. 6 is a partial perspective view of the stator core segment of FIG. 4 coupled to the inner surface of the housing of FIG. 5, in accordance with a non-limiting example.

In a non-limiting example shown in FIG. 6, thermal connection system 92 is defined by an interface between inner surface 52 of housing 46 and outer surface portion 66 of outer annular member 62 established when first annular rib 109 and second annular rib 111 nest within first annular recess 105 and second annular recess 107 respectively. Additional cooling may be provided by incorporating micro-channel(s) 117 into each stator segment 72 as shown in FIG. 7. Micro-channel(s) 117 extend about opening 76 and transport heat away from stator winding 82. Micro-channel(s) 117 may connect to first annular recess 105 and/or second annular recess 107 to further circulate coolant. Micro-channel(s) 117 may also pass through the stator segment 72 via opening 76 to provide additional cooling.

Figure 8:
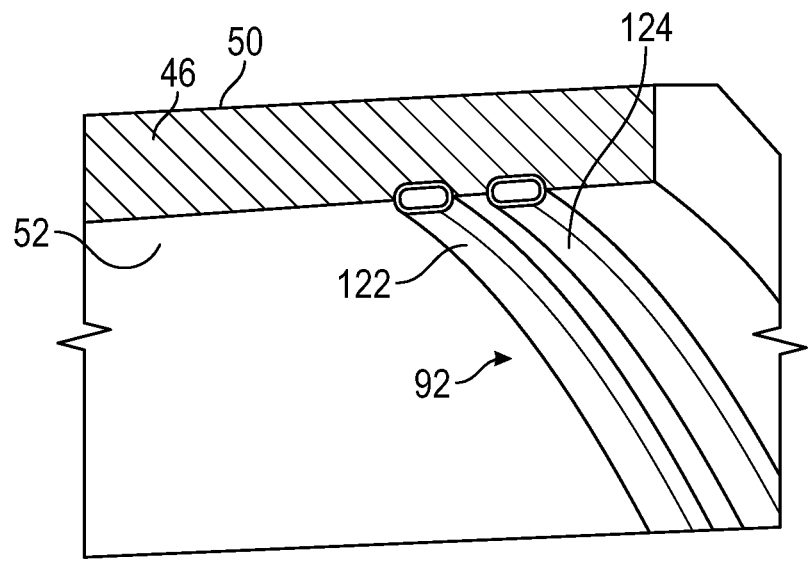
FIG. 8 is a partial perspective view of an inner surface of the electric motor depicting a second portion of the thermal connection system depicting cooling pipes, in accordance with another non-limiting example.
Figure 9:
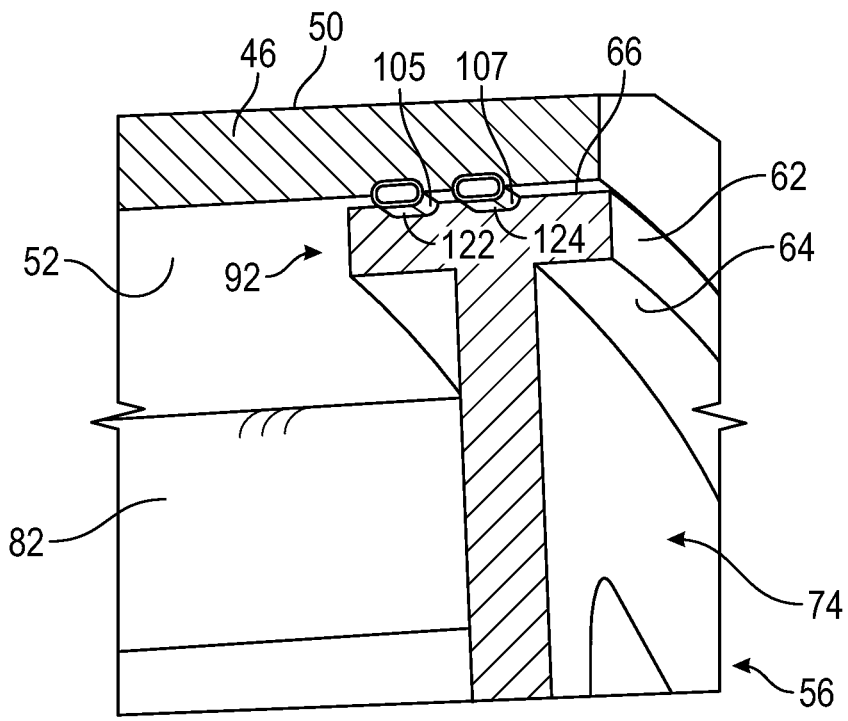
FIG. 9 depicts the cooling pipes of FIG. 8 arranged between the outer surface portion of the stator and the inner surface of the housing, in accordance with a non-limiting example.

Reference will now follow to FIGS. 8 and 9 in describing thermal connection system 92 in accordance with another non-limiting example. In place of first annular rib 109 and second annular rib 111, thermal connection system 92 includes a first cooling pipe 122 and second cooling pipe 124. First cooling pipe 122 and second cooling pipe 124 are provided on inner surface 52 of housing 46 and nest within first annular recess 105 and second annular recess 107 when stator 56 is installed into housing 46.

In a non-limiting example, first cooling pipe 122 and second cooling pipe 124 not only increase a contact surface area between inner surface 52 of housing 46 and outer surface portion 66 of outer annular member 62 but also carry a heat transfer fluid that absorbs heat produced by stator 56. In a non-limiting example, portion(s) of outer surface portion 66 of the outer annular member 62 directly contact inner surface 52 of housing 46 and other portions of outer surface portion 66 are in contact with first cooling pipe 122 and second cooling pipe 124. The direct surface-to-surface contact and contact with first cooling pipe 122 and second cooling pipe 124 increases heat transfer capacity. At this point, it should be understood that the number, size, and arrangement of cooling pipes may vary.

In a non-limiting example, the heat may be removed from the fluid passing through first cooling pipe 122 and second cooling pipe 124 in a heat exchanger (not shown) before being reintroduced into axial flux electric motor 40. It should be understood that first cooling pipe 122 and second cooling pipe 124 may be integrally formed with housing 46 or could be defined by first annular recess 105 and second annular recess 107. In such an arrangement, the cooling pipes could be sealed by a shrink-fit material or through the use of O-rings.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An axial flux electric motor comprising:
    a housing including an inner surface;
    a stator fixedly mounted in the housing, the stator including a plurality of stator segments each supporting a winding, an inner support member defining a central passage, and an outer annular member constraining the plurality of stator segments, the outer annular member including an outer surface portion abutting the inner surface of the housing; and
    a thermal connection system disposed between the outer surface portion of the outer annular member and the inner surface, the thermal connection system transferring heat from the stator into the housing,
    wherein the inner surface of the housing includes a plurality of annular recesses and the outer surface portion of the outer annular member includes a plurality of annular recess portions and wherein spaces between the plurality of annular recesses and the plurality of annular recess portions define a plurality of cooling pipes that are disposed adjacent to one another in an axial direction.

2. The axial flux electric motor according to claim 1, wherein a portion of the outer surface portion of the outer annular member directly contacts the inner surface of the housing and the cooling pipe directly contacts the outer surface portion of the outer annular member and the inner surface of the housing.

3. The axial flux electric motor according to claim 1, wherein the outer surface portion of the outer annular member is in direct contact with the inner surface of the housing.

4. A vehicle comprising:
    a body;
    a plurality of wheels supporting the body; and
    an axial flux electric motor connected to at least one of the plurality of wheels through a transmission, the axial flux electric motor comprising:
    a housing including an inner surface;
    a stator fixedly mounted in the housing, the stator including a plurality of stator segments each supporting a winding, an inner support member defining a central passage, and an outer annular member constraining the plurality of stator segments, the outer annular member including an outer surface portion abutting the inner surface of the housing; and
    a thermal connection system disposed between the outer surface portion of the outer annular member and the inner surface, the thermal connection system transferring heat from the stator into the housing,
    wherein the inner surface of the housing includes a plurality of annular recesses and the outer surface portion of the outer annular member includes a plurality of annular recess portions and wherein spaces between the plurality of annular recesses and the plurality of annular recess portions define a plurality of cooling pipes that are disposed adjacent to one another in an axial direction.

5. The vehicle according to claim 4, wherein the outer surface portion of the outer annular member is in direct contact with the inner surface of the housing.

6. The vehicle according to claim 4, wherein a portion of the outer surface portion of the outer annular member directly contacts the inner surface of the housing and the cooling pipe directly contacts the outer surface portion of the outer annular member and the inner surface of the housing.

7. A vehicle comprising:
    an axial flux electric motor comprising:
    a housing including an inner surface;
    a stator fixedly mounted in the housing, the stator including a plurality of stator segments each supporting a winding, an inner support member defining a central passage, and an outer annular member constraining the plurality of stator segments, the outer annular member including an outer surface portion abutting the inner surface of the housing; and
    a thermal connection system disposed between the outer surface portion of the outer annular member and the inner surface, the thermal connection system transferring heat from the stator into the housing,
    wherein the inner surface of the housing includes a plurality of annular recesses and the outer surface portion of the outer annular member includes a plurality of annular recess portions and wherein spaces between the plurality of annular recesses and the plurality of annular recess portions define a plurality of cooling pipes that are disposed adjacent to one another in an axial direction.

8. The vehicle according to claim 7, wherein the outer surface portion of the outer annular member is in direct contact with the inner surface of the housing.

9. The vehicle according to claim 8, wherein a portion of the outer surface portion of the outer annular member directly contacts the inner surface of the housing and the cooling pipe directly contacts the outer surface portion of the outer annular member and the inner surface of the housing.

* * * * *